United States Patent [19]

Maehara

[11] Patent Number: 4,544,062

[45] Date of Patent: Oct. 1, 1985

[54] MAGNETIC RECORDING TAPE CARTRIDGE

[75] Inventor: Yoshimi Maehara, Kyoto, Japan

[73] Assignee: Hitachi Maxell Ltd., Osaka, Japan

[21] Appl. No.: 474,449

[22] Filed: Mar. 11, 1983

[30] Foreign Application Priority Data

Mar. 13, 1982 [JP] Japan .................. 57-34638

[51] Int. Cl.$^4$ .................. G03B 1/04; B65D 21/02
[52] U.S. Cl. .................. 206/509; 206/519; 242/197; 242/199
[58] Field of Search .............. 206/387, 499, 503, 509, 206/511, 518, 519; 242/197–200

[56] References Cited

U.S. PATENT DOCUMENTS

| | | | |
|---|---|---|---|
| 1,133,387 | 3/1915 | McCarty | 206/499 |
| 1,688,153 | 10/1928 | Pleister | 206/499 |
| 2,545,048 | 3/1951 | Salmons | 206/499 |
| 2,752,678 | 7/1956 | Welch | 206/499 |
| 2,776,772 | 1/1957 | Itoda | 206/511 |
| 3,083,845 | 4/1963 | Kuster | 206/519 |
| 3,469,686 | 9/1969 | Gutsche | 206/518 |
| 3,615,039 | 10/1971 | Ward | 206/519 |

Primary Examiner—George E. Lowrance
Attorney, Agent, or Firm—Birch, Stewart, Kolasch & Birch

[57] ABSTRACT

A magnetic recording tape cartridge comprising a spring plate member for rotatably supporting tape reels, with one or more projected members formed on one face of the spring plate so as to provide a gap between two spring plates when they are stacked to ensure to take the spring plate one by one from the stacked spring plates in a manufacturing process.

7 Claims, 12 Drawing Figures

//4,544,062

MAGNETIC RECORDING TAPE CARTRIDGE

FIELD OF THE INVENTION

The present invention relates to a magnetic recording tape cartridge which has an improved spring member for rotatably supporting tape reels in the recording tape cartridge.

BACKGROUND OF THE INVENTION

As shown in FIGS. 1 and 2, a known video tape cartridge case is formed by a top section 1 and a bottom section 2 made of plastic resin material. Reference numeral 3 indicates a window defined on the top plate of the top section 1 and numerals 4 indicate holes defined in the bottom plate of the bottom section 2 for receiving tape reel driving shafts of a video tape player (not shown). A pair of tape reels 5 are rotatably mounted on the bottom plate of the bottom section 2.

A spring plate 6 having a generally rhombic shape is fixed on the inner surface of the top plate of the top section 1 by bosses 7 so that the free ends 1a thereof press the top end portions of the supporting shafts for the tape reels 5 respectively to rotatably support the tape reels 5.

The spring plate 6 is formed in an arcuate configuration in a side elevational view as shown in FIG. 3(b) with a pair of holes 8 defined for engagement with the bosses 7 as shown in FIG. 3(a).

In the manufacturing process of such a video tape cartridge, before the spring plate 6 is assembled into the cartridge case, a plurality of spring plates 6 are stacked as shown in FIG. 4 and each of the spring plates 6 is taken one by one by suction means and in turn transferred to a predetermined manufacturing process. In the suction process, frequently two or more spring plates stick together partly because the surface of each spring plate is generally very smooth and partly because of the undesired engagement of the stacked spring plates due either to trimmings protruding in the direction of thickness of the spring plate which are formed when the spring plates are pressed or due to viscosity of oil which is sticked to the surfaces of the spring plates during the press work. When two or more spring plates stick together as mentioned above and are transferred to the manufacturing process, frequently two spring plates are assembled in a single cartridge case and/or one of the spring plates is dropped while it is being transferred, thereby reducing the production efficiency.

SUMMARY OF THE INVENTION

Accordingly, an essential object of the present invention is to provide a magnetic recording tape cartridge having a spring plate for supporting tape reels, which is so improved that one spring plate can be taken from a stack of spring plates one at a time, and whereby production efficiency of the magnetic recording tape cartridge is improved.

According to the present invention, there is provided a magnetic recording tape cartridge comprising a cartridge case, at least one tape reel contained in the cartridge case, a spring plate assembled in the cartridge case for resiliently and rotatably supporting at least one tape reel, wherein the improvement comprises providing said spring plate with projection means on its surface to provide gaps between two adjacent spring plates when they are in a stacked position.

DESCRIPTION OF THE PREFERRED EMBODIMENTS

Before the description proceeds, it is to be noted that the spring plates shown in FIGS. 5 through 10 are used in a magnetic recording tape cartridge, for resiliently supporting a pair of tape reels in a similar manner to that used in the conventional magnetic recording tape cartridge.

Figure 1:
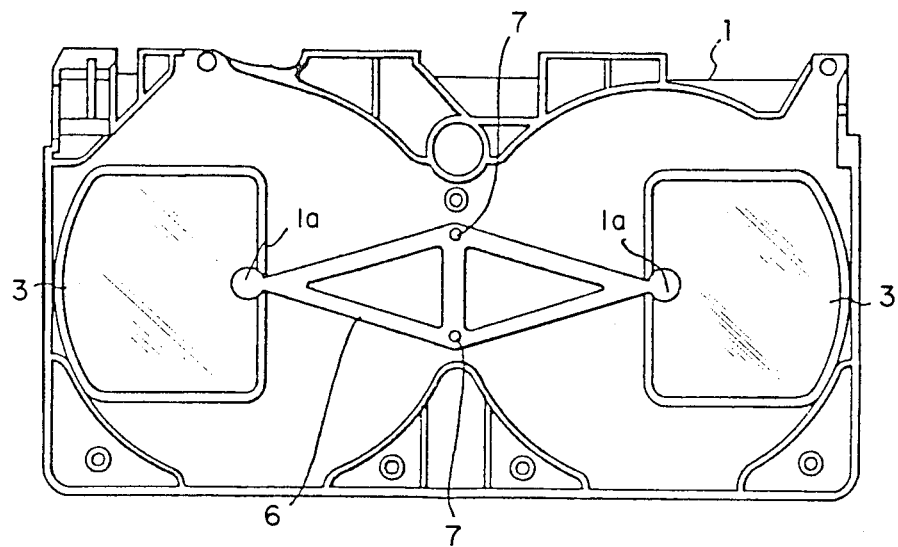
FIG. 1 is a top plan view showing the interior of a top section of a conventional magnetic recording tape cartridge.
Figure 2:
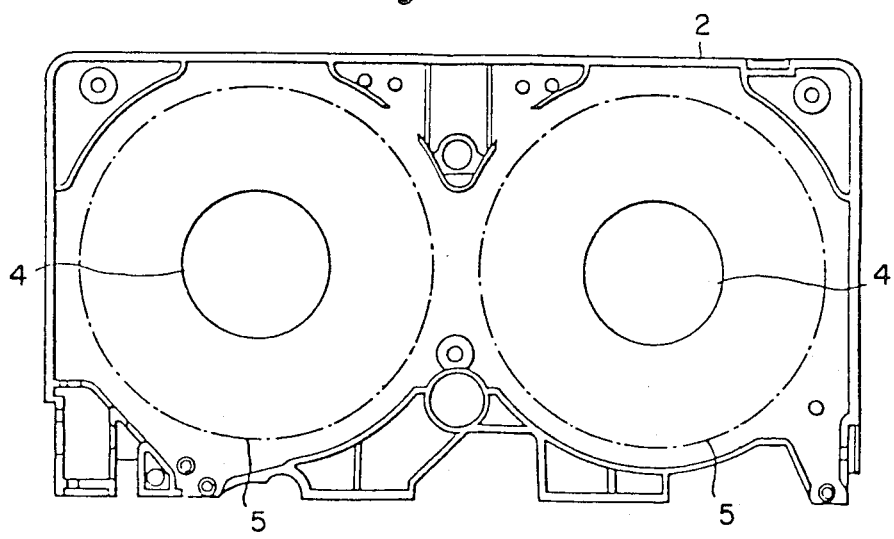
FIG. 2 is a top plan view showing the interior of a bottom section of a conventional magnetic recording tape cartridge.
Figure 3A:
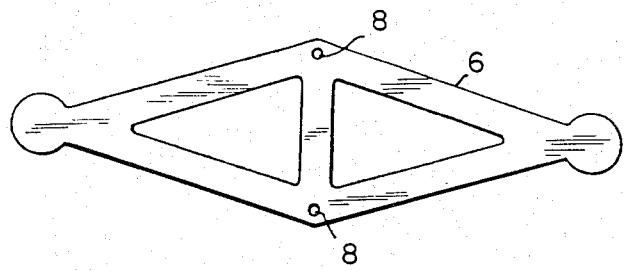
FIG. 3(a) is a top plan view showing a spring plate employed in the conventional magnetic recording tape cartridge.
Figure 3B:
FIG. 3(b) is a side elevational view of the spring plate shown in FIG. 3(a)
Figure 4:
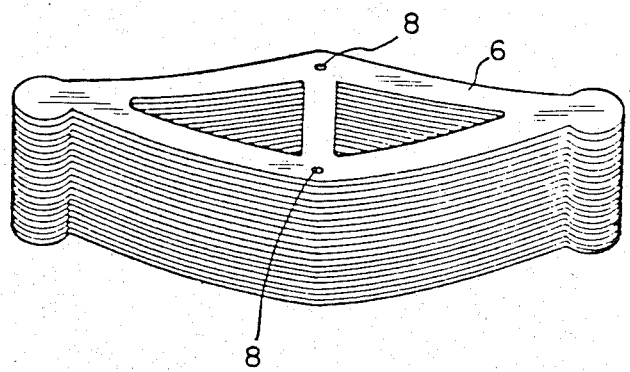
FIG. 4 is a perspective view showing conventional spring plates stacked in the manufacturing process.
Figure 5A:
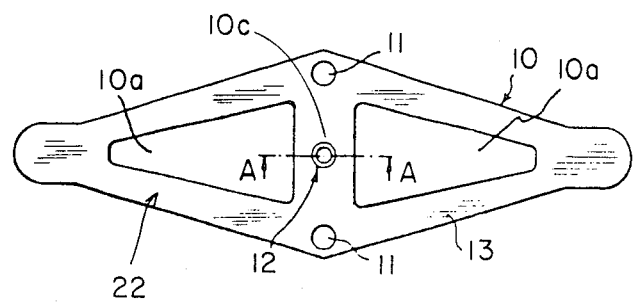
FIG. 5(a) is a top plan view showing an embodiment of a spring plate according to the present invention.
Figure 5B:
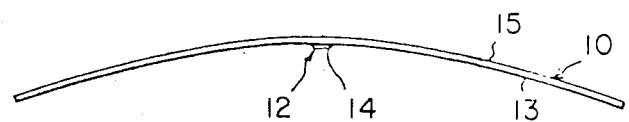
FIG. 5(b) is a side elevational view of the spring plate shown in FIG. 5(a)
Figure 6:
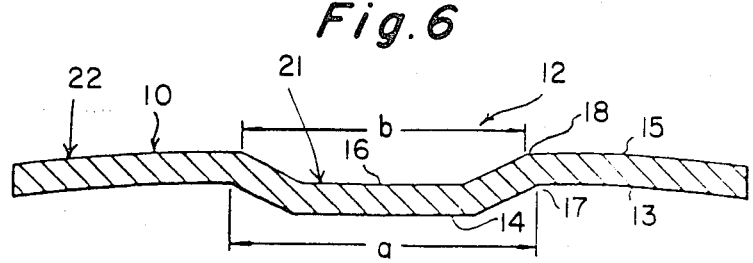
FIG. 6 is an enlarged cross sectional view taken along the line A—A in FIG. 5(a)

Referring to FIGS. 5 and 6, a spring plate 10 made of a resilient metal sheet formed in a generally rhombic configuration in plan view has a pair of holes 11 in opposite corners thereof for insertion of bosses formed on the top section of a video tape cartridge to be secured to the top section in a similar manner to that shown in FIG. 1. Between the holes 11, a small projection 12 having a circular configuration in plan view is formed in the generally central portion of a bridged plate portion 10c between a pair of holes 10a.

The projection 12 projects toward a side 13 which is opposed to the upper surface of the tape reel 4 as shown in FIG. 6 when the spring plate 10 is fixed to the top section 1. Further, the opposed side of the spring plate 10 is concavely formed to define a concavity 16 complementing the projection 12.

The outer diameter a of a projecting surface 14, which is an imaginary circle defined by the outermost periphery 17 of the projection 12 is set to be larger than the diameter b of the concavity 16 which is an imaginary circle defined by the periphery 18 thereof.

When a plurality of spring plates 10 formed in the manner as described are stacked with the projection 12 of one spring plate 10 fitting in the concavity 16 of another spring plate 10 stacked on said one spring plate 10 with the spring plates 10 aligned with each other, there are formed gaps 19 and 20 between the bottom surface 15 of the upper spring plate and the top surface 13 of the lower spring plate in both projecting portions 21 and arm portions 22 of spring plates 10 the tapered portions 23 being in contact with each other.

In other words, the two spring plates 10 are prevented from contacting each other along substantially the entire surfaces thereof.

These gaps 19 and 20 are formed due to the difference between the diameter a of the projecting surface 14 and the diameter b of the concavity 16.

Figure 7:
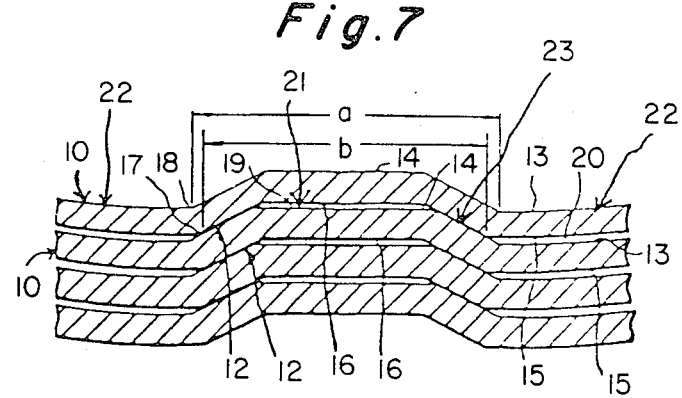
FIG. 7 is an enlarged cross sectional view of the stacked spring plates shown in FIGS. 5(a) and 5(b)

Accordingly, in manufacturing the magnetic recording tape having the spring plate 10 mentioned above, during the suction process for removing one spring plate from the spring plates which are stacked in a manner as shown in FIG. 7 with the gaps 19 and 20 formed therebetween, it is assured that the spring plates can be removed, one at a time from the stack by the suction device. This advantageous feature facilitates the manufacture of the magnetic recording tape cartridge, resulting an improvement in the workability of the manufacturing process.

Figure 8:
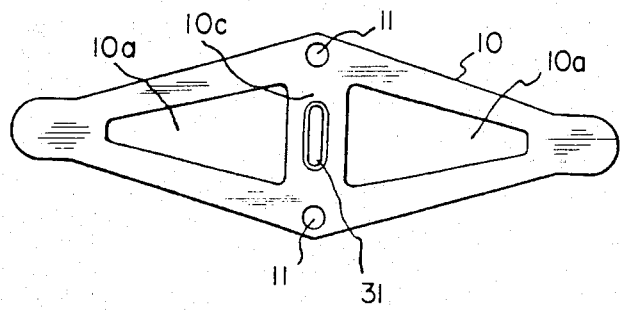
FIGS. 8 through 10 are top plan views showing modifications of the spring plate according to the present invention.

FIG. 8 shows another embodiment of the spring plate 10 for use in a video tape cartridge, in which a projection 31 corresponding to the projection 12 in FIG. 5 has an oval shape with the longitudinal axis thereof directed toward the holes 11.

Figure 9:
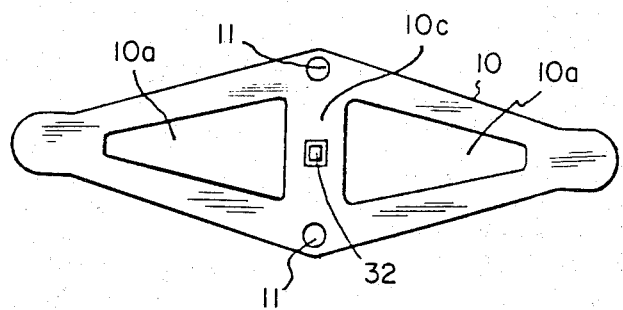

In FIG. 9, a projection 32 corresponding to the projection 12 in FIG. 5 has a square shape in a plan view.

Figure 10:
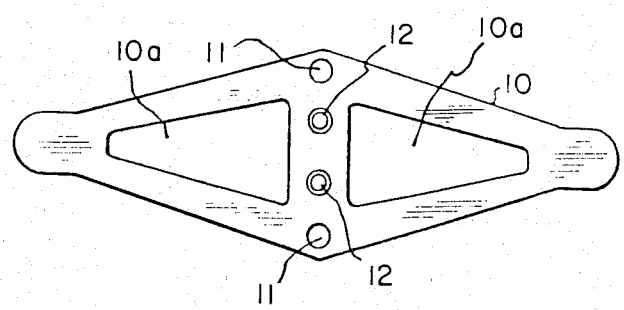

In FIG. 10, two projections 12 are formed in the bridged plate portion 13 of the spring plate 10, with each of the projections 12 formed in a similar manner to that shown in FIGS. 5 through 7.

As apparent from the foregoing, the configuration and the number of the projection 12 (21) (22) can be optionally selected so far as the projections are formed to define gaps 19 and 20 between each two spring plates when they are stacked avoiding contact at entire surfaces thereof.

Also, the shape of the spring plate for supporting the tape reels is not limited to that shown in the embodiments described above.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A magnetic recording tape cartridge assembly comprising:
    a cartridge case having projecting bosses formed on an inner wall thereof;
    a pair of tape reels contained in said case; and
    a spring plate having an intermediate bridge portion which is provided with holes corresponding to said bosses, and a pair of supporting arm portions extending symmetrically from said intermediate bridge portion and assembled in said cartridge case through the engagement of said holes with said bosses for resiliently and rotatably supporting said pair of tape reels, said spring plate being provided with at least one projecting means which is formed at said intermediate bridge portion in a position between said holes said projecting means defining a concavity which compliments said projection to form a tapered portion that is contactable with a corresponding tapered portion of an adjacent spring plate so as to provide gaps between adjacent spring plates when they are stacked before the assembly thereof.

2. The magnetic recording tape cartridge assembly of claim 1, wherein said tapered projection means of said spring plate is structured such that an outside diameter of said projection is greater than an inside diameter of said concavity.

3. A magnetic recording tape catridge assembly comprising:
    a cartridge case having projection bosses formed on an inner wall thereof;
    a pair of tape reels contained in said case, and
    a spring plate having an intermediate bridge portion and a pair of arms symmetrically extending from said intermediate bridge portion so that said pair of arms are bent relative to said intermediate portion so as to form a convex shape on one surface thereof and a corresponding concave shape on a opposite surface thereof with said intermediate bridge portion provided with holes corresponding to said bosses, said spring plate being assembled in said cartridge case through the engagement of said holes with said bosses for resiliently and rotatably supporting said pair of tape reels, said spring plate being provided with at least one projecting means which projects from said concave surface of said spring plate at said intermediate bridge portion at a position between said holes said projecting means defining a concavity which compliments said projection, said projection being with a contactable corresponding projection portion of adjacent spring plate so as to provide gaps between the adjacent spring plates when they are stacked before the assembly thereof.

4. The magnetic recording tape cartridge assembly of claim 3, wherein said projection means form a tapered portion having an outside diameter greater than an inside diameter of said concavity.

5. A spring plate for use in a cartridge case of a magnetic recording tape cartridge assembly, said spring plate having a intermediate bridge portion which is provided with holes therein for mounting in said case of said cartridge assembly and a pair of support arm portions extending symmetrically from said intermediate portion, said spring plate spring plate being further provided with at least one projecting means formed at a position between said holes of said intermediate bridge portion said projection means defining a concavity which compliments said projections to form a tapered portion having a outside diameter of said projection greater than an inside diameter of said concavity so as to provide gaps between adjacent spring plates when they are stacked.

6. The spring plate of claim 5, provided with one projection means.

7. The spring plate of claim 5, provided with a plurality of projection means.

* * * * *